United States Patent
Secinaro et al.

(10) Patent No.: US 11,396,071 B2
(45) Date of Patent: Jul. 26, 2022

(54) SHIM MANUFACTURING METHODS AND DEVICES

(71) Applicant: The Boeing Company, Chicago, IL (US)

(72) Inventors: Nathan Alphonse Secinaro, Seattle, WA (US); Douglas Alan Jones, Shoreline, WA (US); Brent F. Craig, Seattle, WA (US)

(73) Assignee: The Boeing Company, Chicago, IL (US)

( * ) Notice: Subject to any disclaimer, the term of this patent is extended or adjusted under 35 U.S.C. 154(b) by 774 days.

(21) Appl. No.: 16/351,693

(22) Filed: Mar. 13, 2019

(65) Prior Publication Data

US 2020/0290163 A1   Sep. 17, 2020

(51) Int. Cl.
*B23Q 3/00* (2006.01)
*B23Q 3/02* (2006.01)

(52) U.S. Cl.
CPC ............. *B23Q 3/007* (2013.01); *B23Q 3/002* (2013.01); *B23Q 3/02* (2013.01); *B23B 2205/12* (2013.01); *B23B 2205/16* (2013.01)

(58) Field of Classification Search
CPC .......... B23Q 3/002; B23Q 3/007; B23Q 3/02; B23B 2205/12; B23B 2205/16; G01B 7/14; G01B 7/142; G01B 7/28; G01B 7/287

See application file for complete search history.

(56) References Cited

U.S. PATENT DOCUMENTS

| 6,618,505 | B2 * | 9/2003 | Cork ........................ B64F 5/00 73/1.79 |
| 6,762,612 | B2 | 7/2004 | Yu et al. |
| 8,482,302 | B2 | 7/2013 | Suckling et al. |

(Continued)

FOREIGN PATENT DOCUMENTS

EP   2533167 A2   12/2012

OTHER PUBLICATIONS

The Extended European Search Report for EP 20154328.7 dated Aug. 10, 2020, pp. 1-7.

(Continued)

*Primary Examiner* — Tyrone V Hall, Jr.
(74) *Attorney, Agent, or Firm* — Coats & Bennett, PLLC

(57) ABSTRACT

A method of manufacturing a shim and related systems and equipment. A mechanical tool inserted into a shim space defined between two or more components with the mechanical tool in a first configuration. The mechanical tool is free of measurement electronics. The mechanical tool, while in the shim space, is modified such that the mechanical tool assumes a second configuration to establish a plurality of model points corresponding to a boundary surface of the shim space. The mechanical tool is removed from the shim space while maintaining the mechanical tool in the second configuration. Using a measurement station distinct from the tool, the positions of the model points are electronically measured while the mechanical tool is both disposed outside of the shim space and in the second configuration. Machining instructions are generated based on the measured positions. A shim is fabricated based on the generated machining instructions.

20 Claims, 10 Drawing Sheets

(56) References Cited

U.S. PATENT DOCUMENTS

| | | | |
|---|---|---|---|
| 8,813,382 B1 * | 8/2014 | Buttrick | G01B 7/14 |
| | | | 33/563 |
| 8,904,662 B2 * | 12/2014 | Zhang | G01B 5/25 |
| | | | 33/645 |
| 2014/0304998 A1 * | 10/2014 | Zhang | G01B 3/002 |
| | | | 33/545 |
| 2018/0106589 A1 | 4/2018 | Safai et al. | |

OTHER PUBLICATIONS

Capacitec, "Gapman® Gen3 Portable Electronic Feeler Gage", Products—Gap Management Systems, product description, obtained on Feb. 19, 2019, pp. 1-2, obtained from internet: https://www.capacitec.com/Products/Gap-Measurement-Systems/Gapman.

* cited by examiner

SHIM MANUFACTURING METHODS AND DEVICES

TECHNOLOGICAL FIELD

The present disclosure relates generally to manufacturing of shims for filling gaps, and to related methods of manufacturing and/or servicing, and related systems and equipment.

BACKGROUND

During manufacturing and/or rework, it is common that various components may be located relatively close to each other, but need to be joined by a shim. Making the shim is typically a manually intensive process, and typically requires a worker to insert a shim blank into the space between the components (sometimes referred to herein as the "shim space"). The worker then visually observes where high spots in the shim blank are located, either by eye or with some indicator material (e.g., chalk), and modifies the shape of the shim blank, such as by sanding the shim blank in the area of the identified high spot(s), until the desired finished shim is achieved. This process is typically iterative, and therefore expensive and/or time consuming, particularly when there tight tolerance requirements on any gap between shim and the components.

Accordingly, there is a need for alternative approaches to making shims. Such approaches should advantageously reduce the time and/or cost involved, while providing appropriately shaped shims.

SUMMARY

Aspects of the present disclosure are generally directed to a method of manufacturing a shim, such as a shim for a keel beam of an aircraft, and related systems and equipment. Broadly speaking, the method includes inserting a mechanical tool into a shim space defined between two or more components with the mechanical tool in a first configuration. The mechanical tool is free of measurement electronics. The mechanical tool, while in the shim space, is modified such that the mechanical tool assumes a second configuration to establish a plurality of model points corresponding to a boundary surface of the shim space. The mechanical tool is removed from the shim space while maintaining the mechanical tool in the second configuration. Using a measurement station distinct from the tool, the positions of the model points are electronically measured while the mechanical tool is both disposed outside of the shim space and in the second configuration. Machining instructions are generated based on the measured positions. And, a shim is fabricated based on the generated machining instructions.

In some aspects, the present disclosure is directed to a process of manufacturing a shim that includes steps of inserting, modifying, removing, electronically measuring, generating, and fabricating. The process includes inserting a mechanical tool into a shim space defined between two or more components with the mechanical tool in a first configuration. The mechanical tool is free of measurement electronics. The process includes modifying the mechanical tool, while the mechanical tool is in the shim space, such that the mechanical tool assumes a second configuration to establish a plurality of model points corresponding to a boundary surface of the shim space. The process includes removing the mechanical tool from the shim space while maintaining the mechanical tool in the second configuration. The process includes thereafter, electronically measuring, with a measurement station distinct from the mechanical tool, the positions of the model points relative to a reference plane while the mechanical tool is both disposed outside of the shim space and in the second configuration. The process includes generating machining instructions based on the measured positions. Then, the process includes fabricating the shim based on the generated machining instructions. The process optionally includes generating a virtual model of a surface based on the measured positions, and generating the machining instructions based on the virtual model.

In one or more other aspects, the present disclosure is directed to a process of manufacturing a shim for a keel beam of an aircraft that includes steps of inserting, modifying, locking, removing, electronically measuring, generating, and fabricating. The process includes inserting a mechanical tool into a shim space with the mechanical tool in a first configuration. The mechanical tool is free of measurement electronics, and the shim space is defined between an aft keel beam portion and a forward keel beam portion of a keel beam for an aircraft. The process includes modifying the mechanical tool, while the mechanical tool is in the shim space, such that the mechanical tool assumes a second configuration to establish a plurality of model points corresponding to a boundary surface of the shim space. The process includes locking the mechanical tool in the second configuration while the tool is in the shim space. The process includes, after the locking, removing the mechanical tool from the shim space while maintaining the mechanical tool in the second configuration. The process includes thereafter, electronically measuring, with a measurement station distinct from the tool, the positions of the model points relative to a reference plane while the mechanical tool is both disposed outside of the shim space and in the second configuration. The process includes generating machining instructions based on the measured positions. Then, the process includes fabricating the shim based on the generated machining instructions to form the shim, with the fabricating comprising automatically milling material from a shim blank at a fabrication machine. The process optionally includes generating a virtual model of a surface based on the measured positions, and generating machining instructions based on the virtual model.

In one or more other aspects, the present disclosure is directed to a system for manufacturing a shim for insertion into a shim space defined between two or more components. The system includes a mechanical tool, a measurement station, processing circuitry, and a fabrication machine. The mechanical tool is configured to be removably inserted into the shim space and to mechanically measure a boundary surface of the shim space when inserted therein, The mechanical tool is free of measurement electronics. The mechanical tool includes a plurality of model points. The mechanical tool is moveable between a first configuration and a second configuration; the model points are positioned relative to each other differently between the first configuration and the second configuration. In some aspects, the mechanical tool includes a plurality of ball probes, and a corresponding plurality of locks operative to lock the plurality of ball probes. Each ball probe is mounted to a corresponding slidable carriage that is biased by a corresponding spring. The locks are configured such that: 1) when locked, the corresponding slidable carriage is constrained against movement; and 2) when unlocked, the corresponding slidable carriage is free to be moved by the corresponding spring. The measurement station is distinct from the mechanical tool and configured to electronically measure positions of the model points relative to a reference plane while the mechanical tool is both disposed outside of the shim space and in the second configuration. The processing circuitry is configured to generate machining instructions based on the measured positions. In some aspects, the processing circuitry is configured to: 1) generate a virtual model of a surface based on the measured positions; and 2) generate the machining instructions based on the virtual model. The fabrication machine is configured to fabricate the shim based on the generated machining instructions.

The features, functions, and advantages that have been discussed can be achieved independently in various aspects or may be combined in yet other aspects further details of which can be seen with reference to the following description and the drawings.

BRIEF DESCRIPTION OF THE DRAWINGS

Having thus described the disclosure in general terms, reference will now be made to the accompanying drawings, which are not necessarily drawn to scale.

Figure 1:
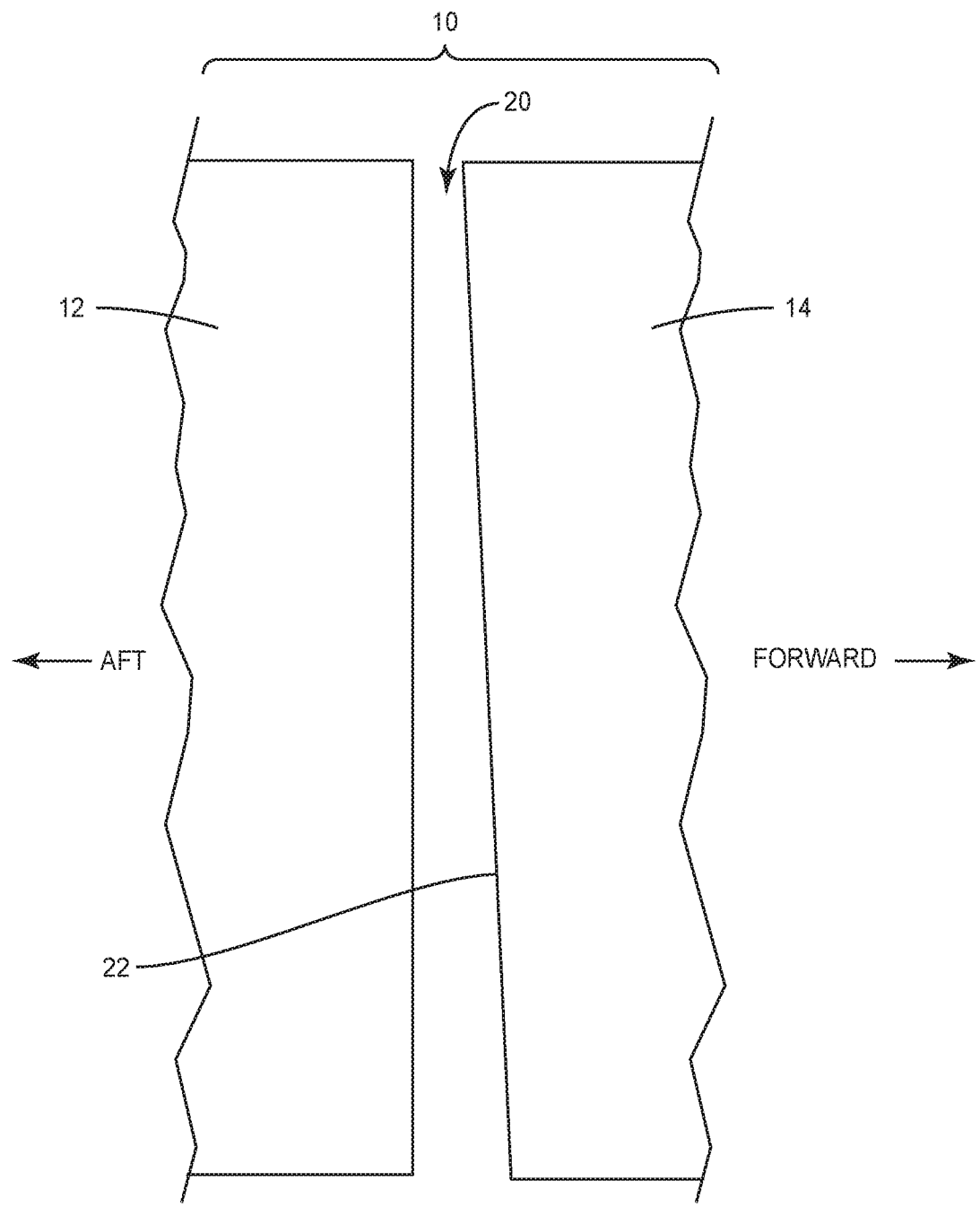

FIG. 1 shows first and second portions of a keel beam that are to be joined by a shim inserted into the shim space.

Figure 2:
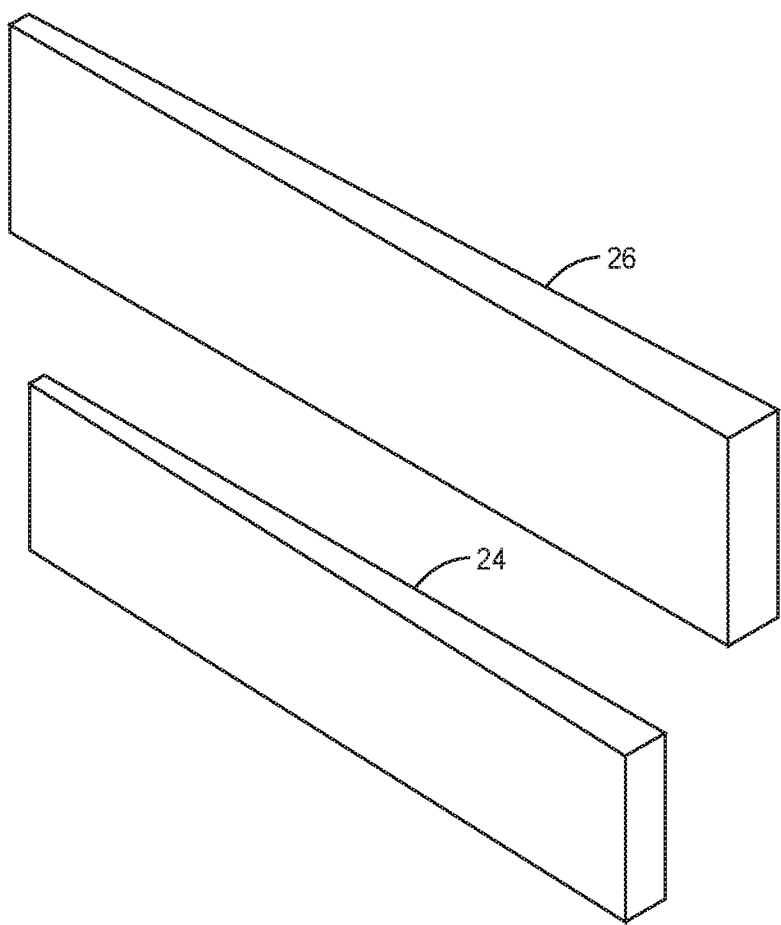

FIG. 2 shows a perspective view of an exemplary shim blank and a fabricated shim.

Figure 3:
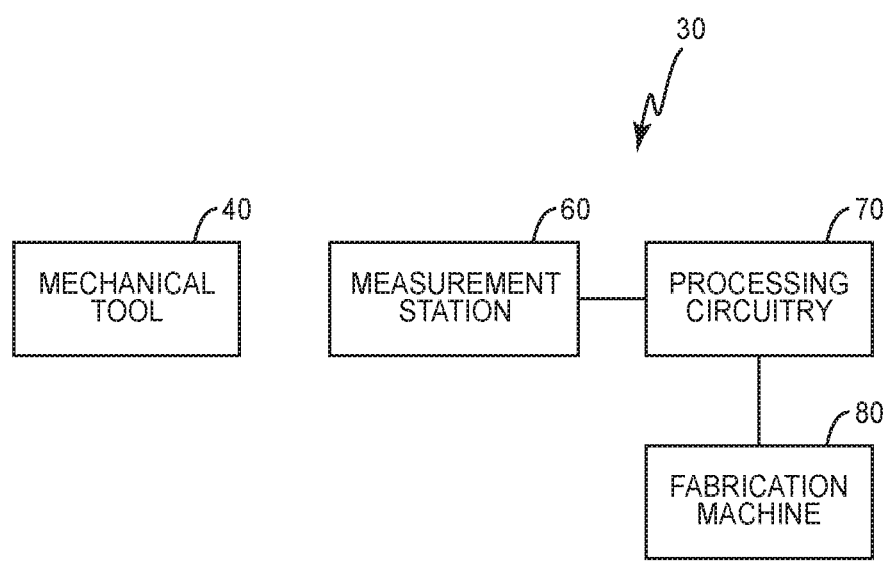

FIG. 3. shows a system for manufacturing a shim according to aspects of the present disclosure.

Figure 4:
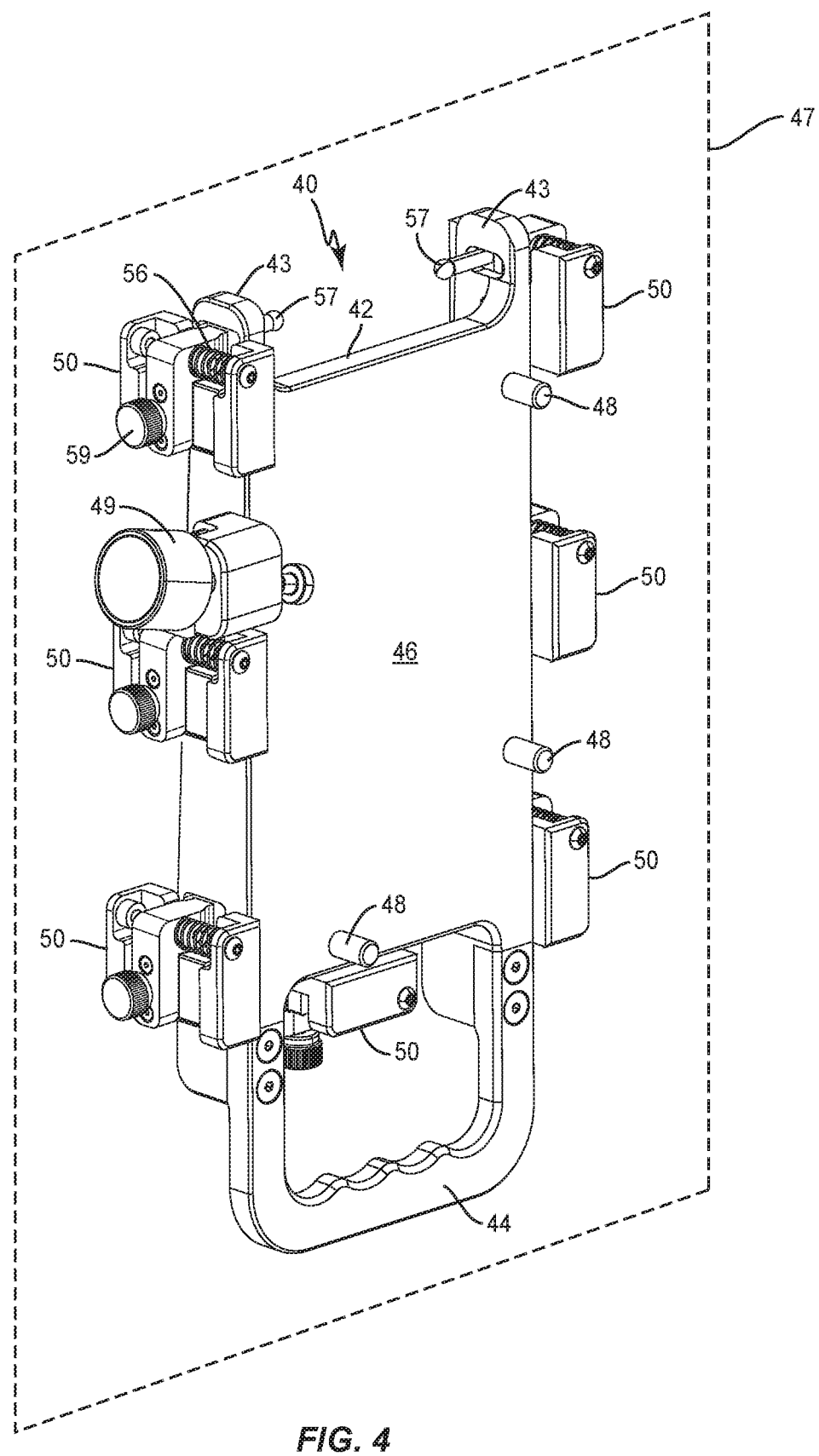

FIG. 4 shows a perspective view of an exemplary mechanical tool according to aspects of the present disclosure.

Figure 5:
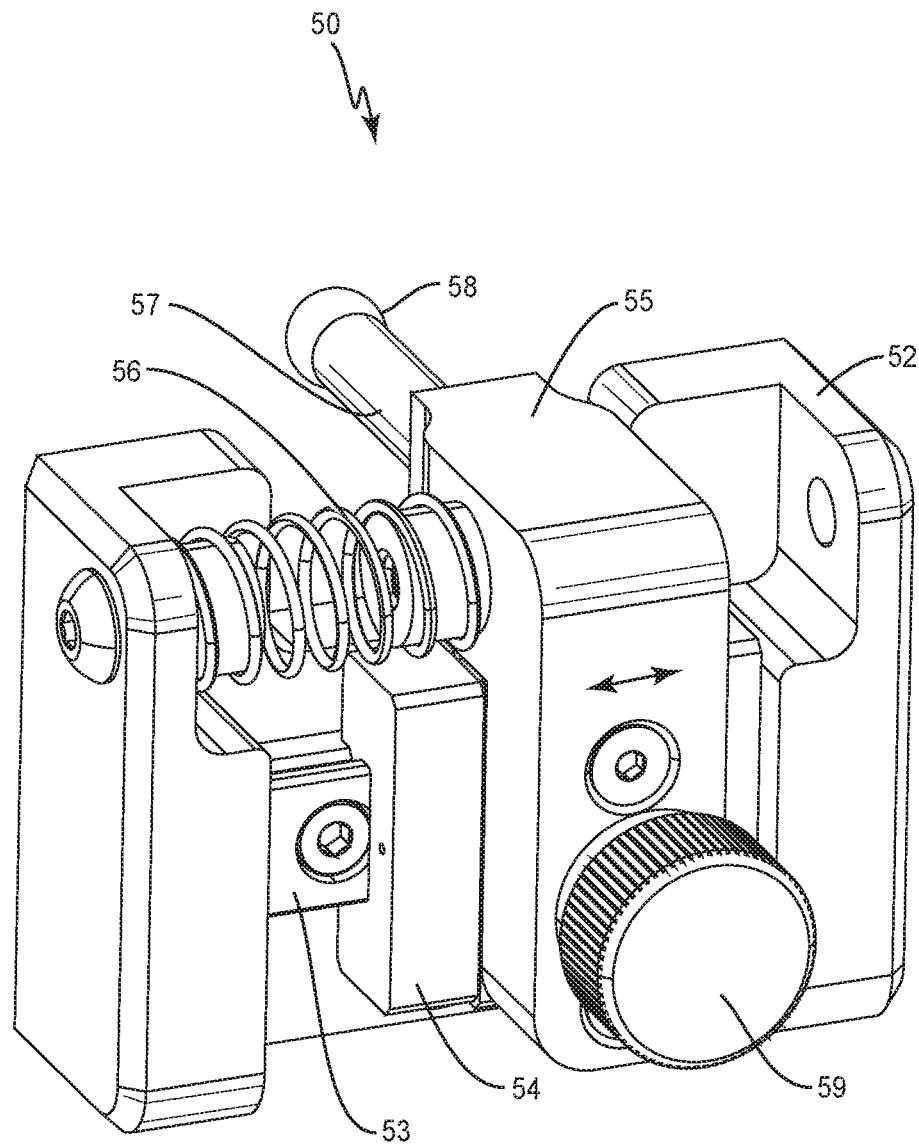

FIG. 5 shows perspective view of a gage module of the mechanical tool of FIG. 4.

Figure 6:
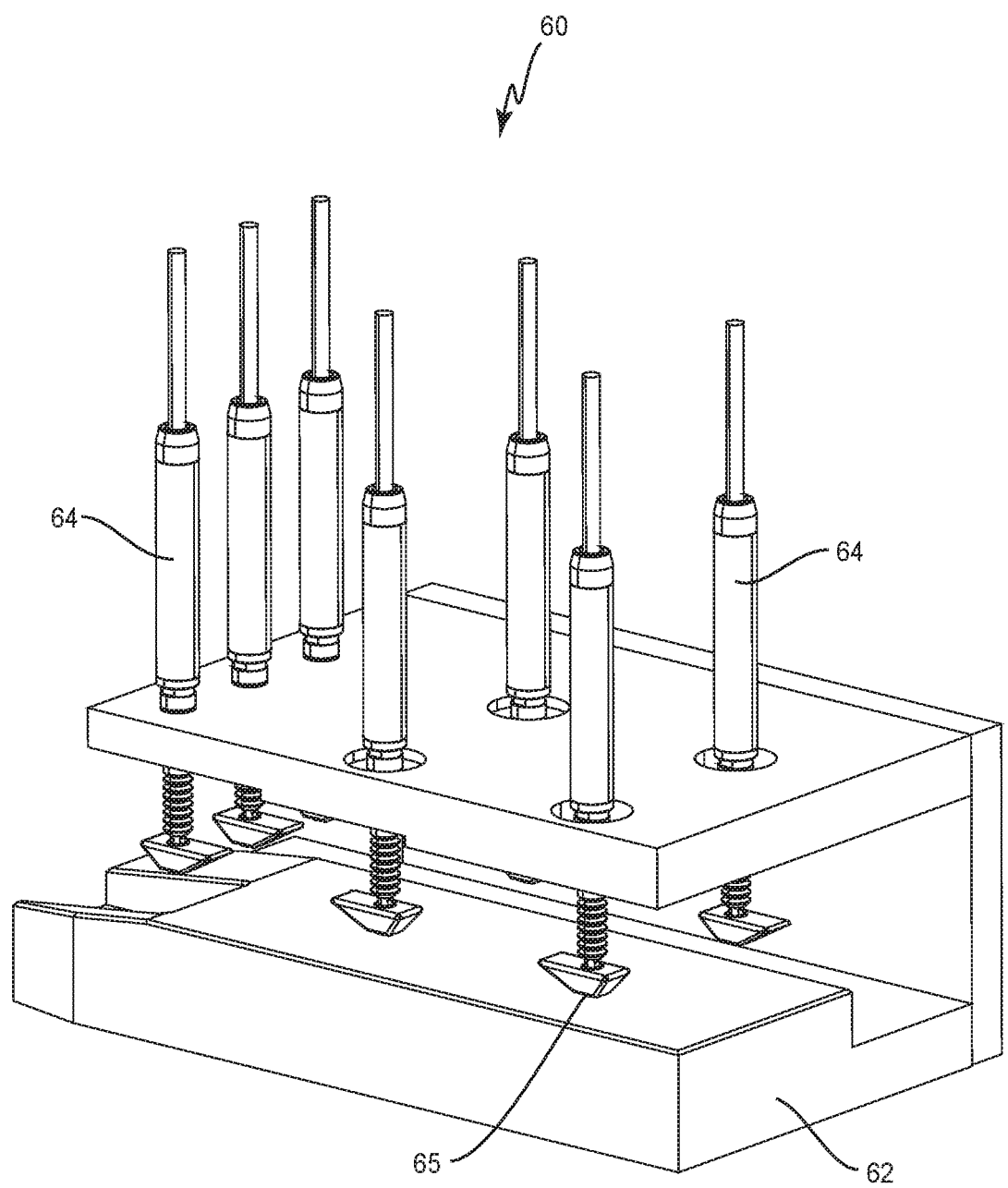

FIG. 6 shows the measurement station of FIG. 3.

Figure 7:
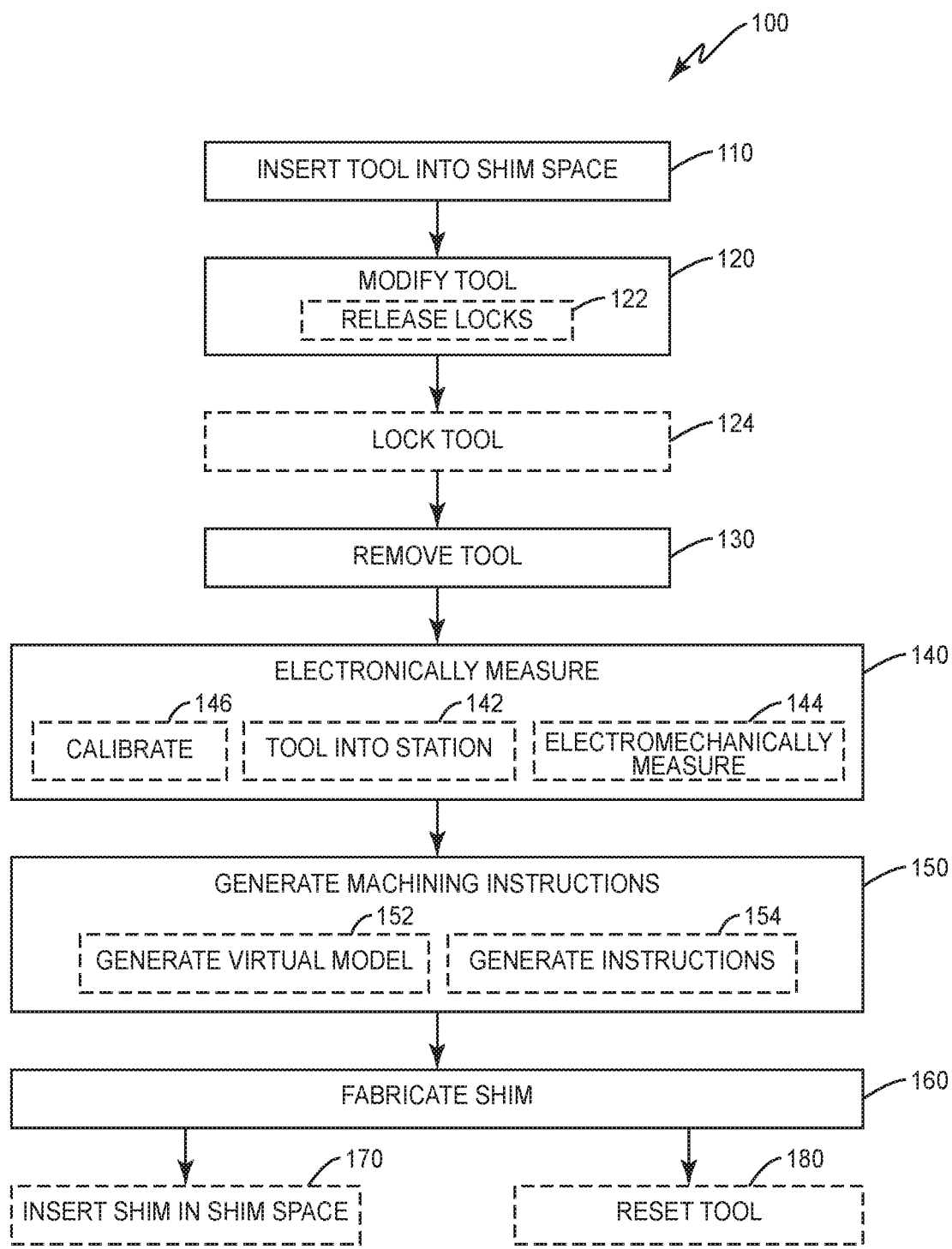

FIG. 7 shows a flowchart pertaining to aspects of the present disclosure.

Figure 8:
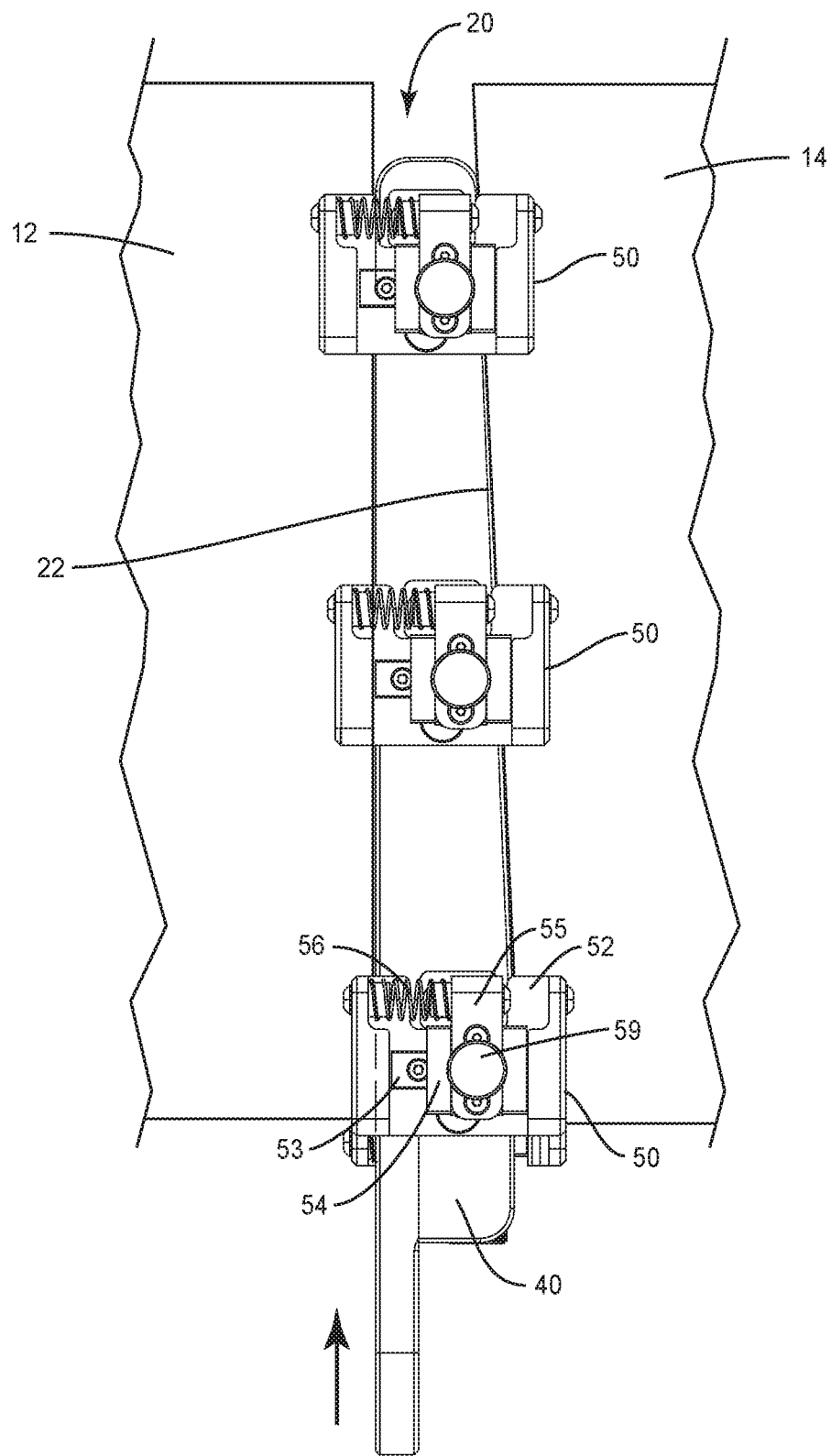

FIG. 8 shows the tool of FIG. 4 being inserted into a shim space in the first configuration.

Figure 9:
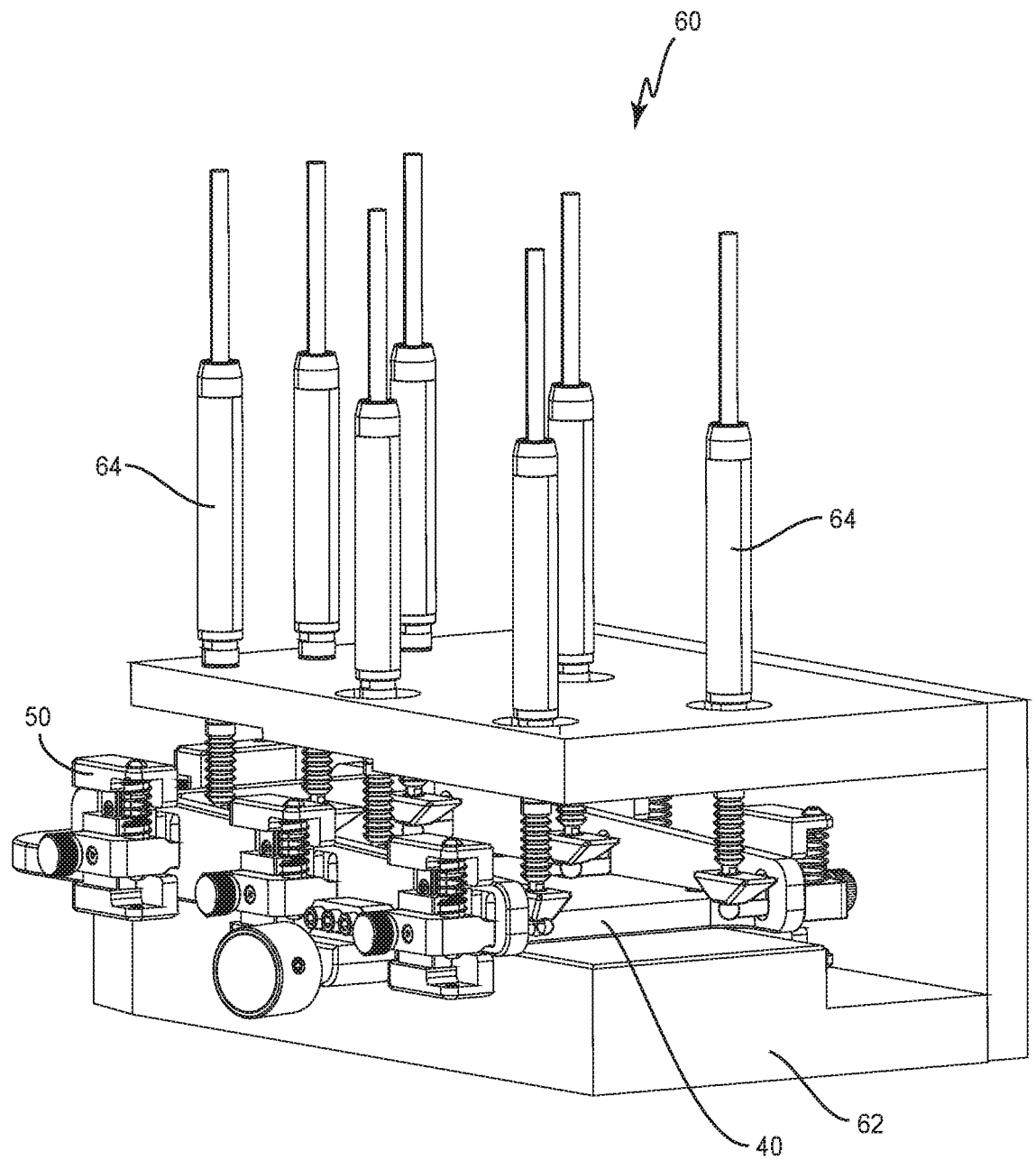

FIG. 9 shows the tool of FIG. 8 disposed in the measurement station, in the second configuration.

Figure 10:
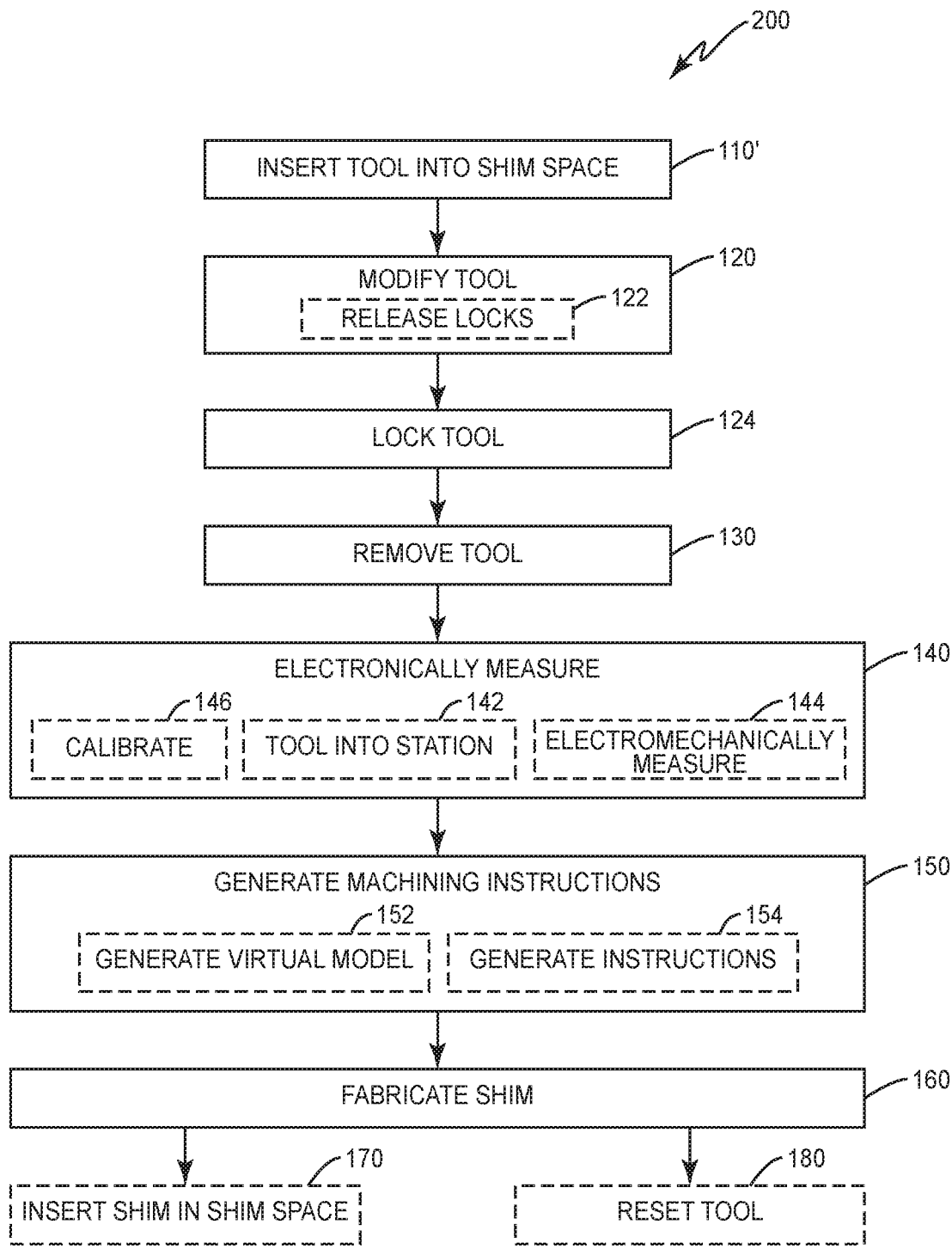

FIG. 10 shows another flowchart pertaining to aspects of the present disclosure.

DETAILED DESCRIPTION

Aspects of the present disclosure are generally directed to a method of manufacturing a shim, such as a shim for a keel beam of an aircraft, and related systems and equipment. Broadly speaking, the method includes inserting a mechanical tool into a shim space defined between two or more components with the mechanical tool in a first configuration. As discussed below, the mechanical tool is free of measurement electronics. The method also includes modifying the mechanical tool, while the mechanical tool is in the shim space, such that the mechanical tool assumes a second configuration to establish a plurality of model points corresponding to a boundary surface of the shim space. The mechanical tool is removed from the shim space while maintaining the mechanical tool in the second configuration. The method includes, thereafter, electronically measuring, with a measurement station distinct from the tool, the positions of the model points relative to a reference plane while the mechanical tool is both disposed outside of the shim space and in the second configuration. Machining instructions are generated based on the measured positions. And, a shim is fabricated based on the generated machining instructions. Optional steps and related apparatuses, such as tool(s) and/or systems, are also described.

An exemplary shim space 20 is shown in FIG. 1. The shim space is defined between two or more components 12,14. For illustrative purposes, the shim space 20 is shown in the context of a keel beam for an aircraft, with the shim space 20 formed between an aft keel beam portion 12 and a forward keel beam portion 14. The aft keel beam portion 12 extends in the aft direction, and the forward keel beam portion 14 extends in the forward direction. The aft keel beam portion 12 is spaced from the forward keel beam portion 14, with the shim space 20 corresponding to the resulting gap. Thus, in FIG. 1, the shim space 20 is defined between the aft keel beam portion 12 and a forward keel beam portion 14 of a keel beam for an aircraft. However, it should be understood that the present disclosure can be used in a variety of applications, including, without limitation, aeronautical, marine, automotive, and/or building construction applications.

A discussion of an exemplary system 30 and mechanical tool 40 may facilitate better understanding before turning to the process in more detail. FIG. 3 shows an exemplary system 30 according to aspects of the present disclosure. The system 30 is for manufacturing a shim for insertion into a shim space 20 defined between two or more components 12,14. In general, the system 30 includes a mechanical tool 40, a measurement station 60, processing circuitry 70, and a fabrication machine 80. The mechanical tool 40 is configured to be removably inserted into the shim space 20 and to mechanically measure a boundary surface of the shim space 20 when inserted therein. The mechanical tool 40 is free of measurement electronics. In general, the mechanical tool 40 includes a plurality of model points 58, and is moveable between a first configuration and a second configuration. The model points 58 are positioned relative to each other differently between the first configuration and the second configuration. The mechanical tool 40 will be discussed in further detail below, but in some aspects, the mechanical tool 40 includes a plurality of ball probes 57, and a corresponding plurality of locks 59 operative to lock the plurality of ball probes 57. Each ball probe 57 is mounted to a corresponding slidable carriage 54 that is biased by a corresponding spring 56. The locks 59 are configured such that: 1) when locked, the corresponding slidable carriage 54 is constrained against movement; and 2) when unlocked, the corresponding slidable carriage 54 is free to be moved by the corresponding spring 56.

The mechanical tool 40 of FIG. 4 includes a mounting plate 42, locating pins 48, an optional plate lock 49, and a plurality of gage modules 50. The mounting plate 42 includes a generally planar middle section, with a pair of outboard flanges 43. One face of the generally planar middle section defines a bearing surface 46. That bearing surface 46 functions as a reference plane 47 for measurements, as discussed below. The mounting plate 42 optionally includes a handle 44 at one end, and is configured to be inserted in a direction opposite the handle 44. Three locating pins 48 are affixed to the mounting plate 42. Two of the locating pins 48 are disposed parallel to a flange 43, and are intended to abut against a side face of one of the components that form the shim space 20 (e.g., the aft keel beam portion 12), and are associated with the flange 43 opposite where the plate lock 49 is mounted. One of the locating pins 48 is located toward the handle 44, and is intended to act as a stop to define a predetermined insertion limit for the mechanical tool 40. The plate lock 49 is affixed to the flange 43 opposite the two locating pins 48. The plate lock 49 is intended to allow the mechanical tool 40 to be releasably secured in place in the shim space 20 by gripping a side face of one of the components that form the shim space 20 (e.g., the aft keel beam portion 12). The plate lock 49 advantageously takes the form of a large thumbscrew mechanism that is torque limited. When tightened, the plate lock 49 causes the mechanical tool 40 to compressively grip the component between the plate lock 49 and the locating pins 48 proximate the opposing flange 43.

The plurality of gage modules 50 are mounted to mounting plate 42. For the illustrative mechanical tool 40 of FIG. 4, there are three gage modules 50 attached to each flange 43, and one gage module 50 mounted near the midline of the mounting plate 42, near the handle 44. The gage modules 50 of FIG. 4 are shown in more detail in FIG. 5, and include a mounting bracket 52, a linear guide rail 53, a carriage 54, a carriage block 55, an spring 56, ball probes 57, and locks 59. The mounting bracket 52 is somewhat elongate, and provides a means for attaching the gage module 50 to the corresponding flange 43, using suitable fasteners, such as screws/bolts. The linear guide rail 53 is mounted to the mounting bracket 52, and is straight. When the gage module 50 is mounted to the mounting plate 42, the linear guide rail 53 is oriented perpendicular to bearing surface 46 of the mounting plate 42. The carriage 54 is slidably mounted on the linear guide rail 53. The carriage block 55 is secured to the carriage 54 so as to move therewith. The carriage block 55 provides a means for securely holding the ball probe 57 so that the ball probe 57 moves with the carriage 54. The spring 56 is disposed between the mounting bracket 52 and the carriage block 55, and provides a bias force that urges the carriage 54 (and the associated carriage block 55 and ball probe 57) in one direction along the linear guide rail 53. The ball probe 57 is mounted to the carriage block 55 and extends transverse (e.g., perpendicular) to the longitudinal axis of the linear guide rail 53. The ball probe 57 extends past the mounting plane of the mounting bracket 52, so that the ball probe 57 will extend into the shim space 20 when the mechanical tool 40 is disposed in the shim space 20. The length of the ball probe 57 may be as desired, and the various ball probes 57 of the various gage modules 50 may have the same length or differing lengths, as is desired. The tip of the ball probe surface facing in the direction of the spring 56 force defines a model point 58, as this is the point on the ball probe 57 that will contact the component 12,14 when in use. The lock 59 is operatively coupled to the carriage 54, such as by being mounted to the carriage block 55, which is in turn mounted to the carriage 54. The lock 59 is intended to releasably fix the position of the carriage 54, and thus the ball probe 57, along the linear guide rail 53. In some aspects, the lock 59 takes the form of a thumbscrew mechanism that selectively engages the linear guide rail 53. As can be appreciated, the lock 59 can be moved between a locked state and an unlocked state by the user.

The measurement station 60 is distinct from the mechanical tool 40, and is configured to electronically measure positions of the model points 58 relative to the reference plane 47 while the mechanical tool 40 is both disposed outside of the shim space 20 and in the second configuration. An exemplary measurement station 60 is shown in FIG. 6. The measurement station 60 includes a plurality of position sensors 64 that are used to electronically measure the positions of the model points 58. In some aspects, the position sensors are linear variable differential transformers which transform mechanical displacement into electronic measurement data. In other aspects, the positions of the model points 58 are electronically measured via other or additional types of position sensors 64, such as position sensors 64 that rely on optical interferometry and/or differential capacitance. The data from the position sensors 64 is communicated to the processing circuitry 70 via suitable wired and/or wireless communication connections, and/or via a suitable storage device, such as a so-called thumb-drive. The measurement station 60 of FIG. 6 includes a frame 62, and plurality of position sensors 64 mounted to the frame 62 in known locations. The frame advantageously includes a lower plate, an open middle section, and an upper plate, so as to be generally C-shaped. The position sensors 64 illustrated in FIG. 6 are linear variable differential transformers. The linear variable differential transformers electronically measure the displacement of their tips 65. In an illustrative example, as discussed further below, the tips 65 of the linear variable differential transformers rest against the model points 58 on the ball probes 57 when the mechanical tool 40 is inserted in the measurement station 60. In some aspects, suitable ramps may be attached near the tips to allow the mechanical tool 40 to be inserted into, and removed from, the measurement station 60 without catching on the tips 65. Note that having the position sensors 64 associated with the measurement station 60, which is located remote from and not part of the mechanical tool 40, obviates the need to place typically delicate and/or expensive position sensors 64 in the shim space 20. Thus, delicate and/or expensive position sensors 64 less likely to be damaged.

The processing circuitry 70 is configured to generate machining instructions based on the measured positions. The processing circuitry 70 advantageously takes form of one or more computing units, optionally communicatively interconnected to form a suitable computing network. In some aspects, the processing circuitry 70 is configured to: 1) generate a virtual model of a surface based on the measured positions; and 2) generate the machining instructions based on the virtual model. The virtual model is in any suitable format, and may advantageously be based on a seed model that generally approximates the anticipated final shape of the relevant surface(s). The machining instructions may be stored for later use, or provided directly to the fabrication machine 80.

The fabrication machine 80 is configured to fabricate the shim based on the generated machining instructions. Thus, the machining instructions generated by the processing circuitry 70 are provided to the fabrication machine 80. In some aspects, the fabrication machine 80 is a milling machine, such as a portable milling machine. In such aspects, material is removed (e.g., automatically milled) from a shim blank 26, based on the fabrication instructions. In other aspects, the fabrication machine 80 is a 3D printer.

Referring to FIG. 7, aspects of the present disclosure relate to a process (or "method") (100) of manufacturing the shim 24 that generally includes inserting (110) the mechanical tool 40 into the shim space 20, modifying (120) the mechanical tool 40, removing (130) the mechanical tool 40, electronically measuring (140), generating (150) machining instructions, and fabricating (160) the shim 24.

The process of FIG. 7, generally indicated at 100, begins with inserting (110) the mechanical tool 40 into the shim space 20 defined between two or more components 12,14 with the mechanical tool 40 in a first configuration. See FIG. 8. As noted above, the mechanical tool 40 is free of measurement electronics. The gage modules 50 may be unlocked during the insertion, but better results are believed achieved if, prior to inserting the mechanical tool 40 into the shim space 20, the mechanical tool 40 is optionally locked in the first configuration. For example, prior to the inserting (110), each gage module 50 may have its lock 59 unlocked, the carriage 54 moved all the way toward the spring 56 (so as to compress the spring 56) and the bearing surface 46, and then the lock 59 locked. For purposes of illustration, it will be assumed that the bearing surface 46 is aft-facing, but this is not required.

The process (100) continues with modifying (120) the mechanical tool 40, while the mechanical tool 40 is in the shim space 20, such that the mechanical tool 40 assumes a second configuration to establish a plurality of model points 58 corresponding to a boundary surface of the shim space 20. For example, after the inserting (110), the mechanical tool 40 may be releasably held in position in the shim space 20 by tightening the plate lock 49, and then the gage modules 50 may be unlocked. This allows the bearing surface 46 to register against one of the surfaces forming the boundary of the shim space 20 (e.g., the forward face of the aft keel beam portion 12). The springs 56 of the gage modules 50 act to both press the bearing surface 46 against one component, and move the carriages 54 to press the corresponding ball probes 57 (and thus the corresponding model points 58) against the opposing component (e.g., the aft face of the forward keel beam portion 14). Once the ball probes 57 are resting against the surface forming the boundary surface 22 of the shim space 20, the locks 59 of the gage modules 50 may be locked so as to lock the ball probes 57 in position relative to the reference plane 47 of bearing surface 46.

The process (100) continues with removing (130) the mechanical tool 40 from the shim space 20 while maintaining the mechanical tool 40 in the second configuration. For example, the plate lock 49 may be unlocked (e.g., the thumbscrew can be loosened). Then, the mechanical tool 40 may be slid out of the shim space 20. Care should be taken to not accidentally dislodge the ball probes 57, and thereby inadvertently change the relative positions of the model points 58 and the reference plane 47.

Thereafter, the process (100) continues with electronically measuring (140), with the measurement station 60, the positions of the model points 58 relative to a reference plane 47 while the mechanical tool 40 is both disposed outside of the shim space 20 and in the second configuration. See FIG. 9. As noted above, the measurement station 60 is distinct from the mechanical tool 40. The electronically measuring (140) optionally includes inserting (142) the mechanical tool 40 into the measurement station 60 remote from the shim space 20, and electromechanically measuring (144) the positions of the model points 58 relative to the reference plane 47 while the mechanical tool 40 is in the second configuration. For example, after removal from the shim space 20, the mechanical tool 40 may be transported (e.g., walked) to the measurement station 60, and the mechanical tool 40 inserted into the frame of the measurement station 60 so that 1) the locating pin 48 near the handle 44 rests against a suitable stop so that the mechanical tool 40 is in a repeatable known position, and 2) the position sensors 64 are properly positioned relative to the model points 58 (e.g., the tips of the linear variable differential transformers are resting against their respective ball probes 57). It should be noted that in some aspects, the electronically measuring includes electronically measuring using position sensor that are linear variable differential transformers. In other aspects, other forms of position sensors (64) (e.g., optical position sensors, capacitance based position sensors, etc.) are alternatively and/or additionally used. In some aspects, the process (100) optionally includes, prior to the electronically measuring, calibrating (146) the measurement station 60, such as by using a known calibration tool with known thicknesses at the positions of the position sensors 64 when projected onto the reference plane 47.

The process (100) continues with generating (150) machining instructions based on the measured positions. The generating (150) the machining instructions optionally includes 1) generating (152) a virtual model of a surface based on the measured positions; and 2) generating (154) the machining instructions based on the virtual model. The processing circuitry 70 is used for generating the machining instructions.

The process (100) continues with fabricating (160) the shim 24 based on the generated machining instructions. The fabricating (160) the shim 24 optionally includes automatically milling material from a shim blank 26 based on the generated machining instructions.

As discussed above, the mechanical tool 40 optionally includes a plurality of ball probes 57 that are disposed in spaced relation to each other. In such aspects, the process (100) optionally includes, between the modifying (120) and the removing (130), locking (124) the mechanical tool 40 in the second configuration by locking the plurality of ball probes 57 in position. In some aspects, as described above, each ball probe 57 is mounted to a corresponding slidable carriage 54 that is biased by a corresponding spring 56. In such aspects, the process optionally is such that, during the inserting (110), each of the slidable carriages 54 is constrained against movement; and the modifying (12) includes releasing the slidable carriages 54 to be moved by the corresponding springs 56.

In some aspects, the process (100) continues with, after the fabricating (160) the shim 24, inserting (110) the shim 24 into the shim space 20 and/or restoring (180) the mechanical tool 40 to the first configuration. Restoring (180) the mechanical tool 40 to the first configuration may be achieved in a variety of ways, such as by having each gage module 50 have its lock 59 unlocked, the carriage 54 moved all the way toward the spring 56 (so as to compress the spring 56) and the bearing surface 46, and then the lock 59 locked.

Referring to FIG. 10, the general process (100) described above may be more particularly applied as a process (or "method") (200) of manufacturing a shim 24 for a keel beam of an aircraft. The process (200) of manufacturing the shim 24 for a keel beam of an aircraft generally includes inserting (110') the mechanical tool 40 into the shim space 20, modifying (120) the mechanical tool 40, locking (124) the mechanical tool 40 in a second configuration, removing (130) the mechanical tool 40, electronically measuring (140), generating (150) machining instructions, and fabricating (160) the shim 24. Note that the modifying (120), locking (124), removing (130), electronically measuring (140), generating (150), and fabricating (160) are the same in process (200) as in process (100), and a detailed description thereof is not repeated herein in the interest of brevity. Process (200) of FIG. 10 differs from process (100) of FIG. 7, in that the inserting (110') of process (200) involves inserting the mechanical tool 40 into the shim space 20 with the mechanical tool 40 in a first configuration, with the shim space 20 defined between the aft keel beam portion 12 and the forward keel beam portion 14 of a keel beam for an aircraft. As further noted above, the mechanical tool 40 is free of measurement electronics. As can be seen, process (200) includes locking (124) the mechanical tool 40 in the second configuration while the tool is in the shim space 20, and the removing (130) occurs after the locking (124).

Further, the fabricating (160) of process (200) includes automatically milling material from a shim blank 26 at the fabrication machine 80.

In some aspects of process (200), the generating (150) the machining instructions includes: 1) generating (152) a virtual model of a surface based on the measured positions; and 2) generating (154) machining instructions based on the virtual model.

In some aspects of process (200), the mechanical tool 40 includes a plurality of ball probes 57 that are disposed in spaced relation to each other. In such aspects, the locking (124) the mechanical tool 40 in the second configuration comprises locking the mechanical tool 40 in the second configuration by locking the plurality of ball probes 57 in position. In some aspects, the each ball probe 57 is mounted to a corresponding slidable carriage 54 that is biased by a corresponding spring 56. For such aspects of process (200), during the inserting (110'), each of the slidable carriages 54 is constrained against movement; and the modifying (120) includes releasing the slidable carriages 54 to be moved by the corresponding springs 56.

In some aspects, process (200) optionally continues with restoring (180) the mechanical tool 40 to the first configuration.

Some illustrative examples above have used a mechanical tool 40 with seven gage modules 50 (three on each side, and one located midline near the handle 44), and therefore seven ball probes 57. Such an arrangement allows for the boundary surface 22 to be modeled based on seven model points 58 that are spaced from each other. However, it should be understood that any suitable number of a plurality of model points 58 (and corresponding gage modules 50) may be used, such as two, three, four, . . . ten, . . . , etc. Further, while some illustrative examples have used ball probes 57 with uniform lengths and located near a perimeter of the boundary surface 22, the ball probes 57 may be located at various positions when viewed normal to the boundary surface, such as some near a midline of the boundary surface 22, some near a periphery, etc.

In the interest of clarity, the discussion above has generally been in the context of a shim space 20 defined between two components 12,14. However, the processes (100, 200) and apparatuses described above are additionally and/or alternatively used for fabricating a shim 24 for a shim space 20 defined by three or more components, such as for three components or four components, etc., whether those components converge on the shim space 20 from opposite directions and/or angles, or from disparate directions and/or angles, or from a mix thereof.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method of manufacturing a shim, comprising:
   inserting a mechanical tool into a shim space defined between two or more components with the mechanical tool in a first configuration; the mechanical tool being free of measurement electronics;
   modifying the mechanical tool, while the mechanical tool is in the shim space, such that the mechanical tool assumes a second configuration to establish a plurality of model points corresponding to a boundary surface of the shim space;
   removing the mechanical tool from the shim space while maintaining the mechanical tool in the second configuration;
   thereafter, electronically measuring, with a measurement station distinct from the mechanical tool, positions of the model points relative to a reference plane while the mechanical tool is both disposed outside of the shim space and in the second configuration;
   generating machining instructions based on the measured positions; and
   fabricating the shim based on the generated machining instructions.

2. The method of claim 1, wherein the fabricating comprises automatically milling material from a shim blank based on the generated machining instructions.

3. The method of claim 1, wherein the generating machining instructions comprises:
   generating a virtual model of a surface based on the measured positions; and
   generating the machining instructions based on the virtual model.

4. The method of claim 1, wherein the electronically measuring comprises:
   inserting the mechanical tool into the measurement station remote from the shim space; and
   thereafter electromechanically measuring positions of the model points relative to the reference plane while the mechanical tool is in the second configuration.

5. The method of claim 1:
   wherein the mechanical tool comprises a plurality of ball probes that are disposed in spaced relation to each other; and
   further comprising, between the modifying and the removing, locking the mechanical tool in the second configuration by locking the plurality of ball probes in position.

6. The method of claim 5:
   wherein each ball probe is mounted to a corresponding slidable carriage that is biased by a corresponding spring;
   wherein, during the inserting, each of the slidable carriages is constrained against movement; and
   wherein the modifying comprises releasing the slidable carriages to be moved by the corresponding springs.

7. The method of claim 1, further comprising, prior to the electronically measuring, calibrating the measurement station.

8. The method of claim 1, wherein the electronically measuring comprises electronically measuring using position sensors that are linear variable differential transformers.

9. The method of claim 1, further comprising, after the fabricating, inserting the fabricated shim into the shim space.

10. The method of claim 1, further comprising, thereafter restoring the mechanical tool to the first configuration.

11. A method of manufacturing a shim for a keel beam of an aircraft, comprising:
    inserting a mechanical tool into a shim space with the mechanical tool in a first configuration; the mechanical tool being free of measurement electronics; the shim space defined between an aft keel beam portion and a forward keel beam portion of a keel beam for an aircraft;
    modifying the mechanical tool, while the mechanical tool is in the shim space, such that the mechanical tool assumes a second configuration to establish a plurality of model points corresponding to a boundary surface of the shim space;

locking the mechanical tool in the second configuration while the mechanical tool is in the shim space;

after the locking, removing the mechanical tool from the shim space while maintaining the mechanical tool in the second configuration;

thereafter, electronically measuring, with a measurement station distinct from the tool, positions of the model points relative to a reference plane while the mechanical tool is both disposed outside of the shim space and in the second configuration;

generating machining instructions based on the measured positions; and fabricating the shim based on the generated machining instructions to form the shim; wherein the fabricating comprises automatically milling material from a shim blank at a fabrication machine.

12. The method of claim 11, wherein the generating the machining instructions comprises:

generating a virtual model of a surface based on the measured positions; and generating the machining instructions based on the virtual model.

13. The method of claim 11:

wherein the mechanical tool comprises a plurality of ball probes that are disposed in spaced relation to each other; and wherein the locking the mechanical tool in the second configuration comprises locking the mechanical tool in the second configuration by locking the plurality of ball probes in position.

14. The method of claim 13:

wherein each ball probe is mounted to a corresponding slidable carriage that is biased by a corresponding spring;

wherein, during the inserting, each of the slidable carriages is constrained against movement; and wherein the modifying comprises releasing the slidable carriages to be moved by the corresponding springs.

15. The method of claim 11, further comprising, thereafter restoring the mechanical tool to the first configuration.

16. A system for manufacturing a shim for insertion into a shim space defined between two or more components, the system comprising:

a mechanical tool configured to be removably inserted into the shim space and to mechanically measure a boundary surface of the shim space when inserted therein; the mechanical tool being free of measurement electronics; the mechanical tool comprising a plurality of model points and moveable between a first configuration and a second configuration; wherein the model points are positioned relative to each other differently between the first configuration and the second configuration;

a measurement station, distinct from the mechanical tool and configured to electronically measure positions of the model points relative to a reference plane while the mechanical tool is both disposed outside of the shim space and in the second configuration;

processing circuitry configured to generate machining instructions based on the measured positions; and a fabrication machine configured to fabricate the shim based on the generated machining instructions.

17. The system of claim 16, wherein the fabrication machine comprises a milling machine.

18. The system of claim 16, wherein the processing circuitry is configured to:

generate a virtual model of a surface based on the measured positions; and generate the machining instructions based on the virtual model.

19. The system of claim 16, wherein the measurement station comprises a plurality of position sensors that are linear variable differential transformers.

20. The system of claim 16, wherein the mechanical tool comprises:

a plurality of ball probes; and a corresponding plurality of locks operative to lock the plurality of ball probes;

wherein each ball probe is mounted to a corresponding slidable carriage that is biased by a corresponding spring;

wherein the locks are configured such that:

when locked, the corresponding slidable carriage is constrained against movement; and when unlocked, the corresponding slidable carriage is free to be moved by the corresponding spring.

* * * * *